(No Model.)
J. H. RILEY.
SAW.
No. 293,276. Patented Feb. 12, 1884.
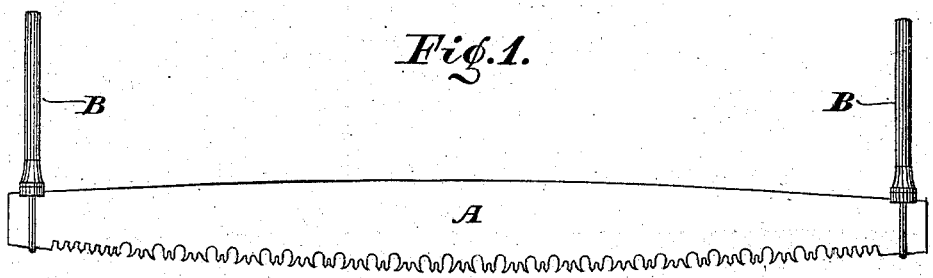
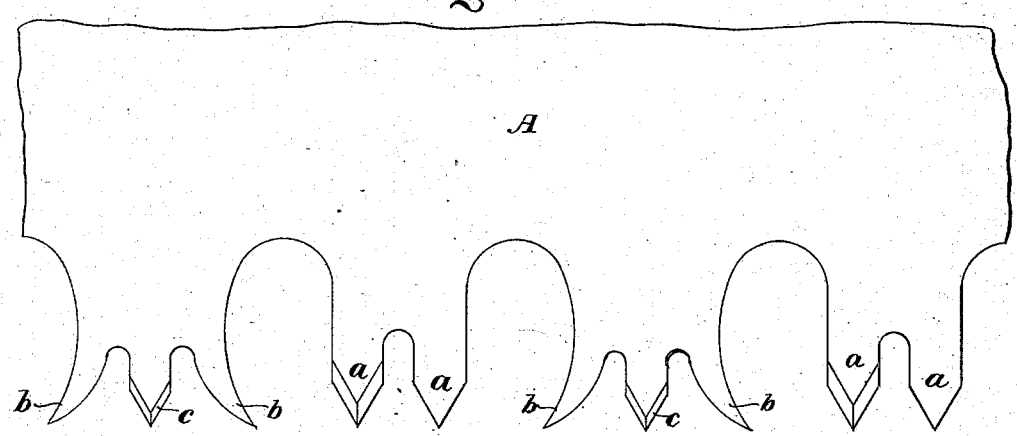
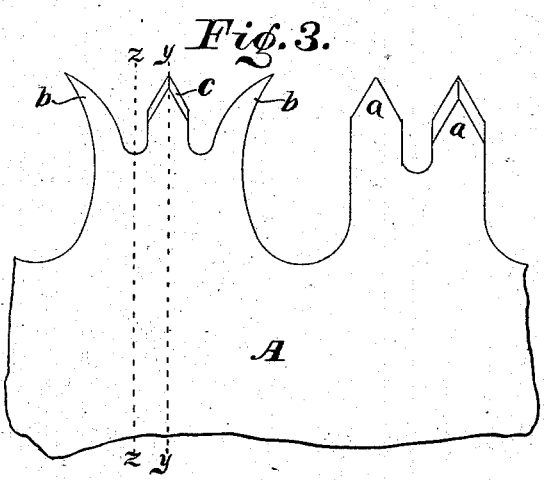 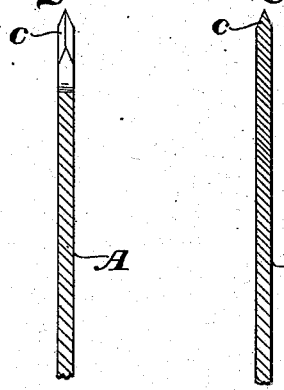
WITNESSES.
Chas. N. Leonard.
Chas. L. Thurber.
INVENTOR.
John H. Riley,
PER
C. Bradford,
ATTORNEY.

UNITED STATES PATENT OFFICE.

JOHN H. RILEY, OF INDIANAPOLIS, INDIANA.

SAW.

SPECIFICATION forming part of Letters Patent No. 293,276, dated February 12, 1884.

Application filed June 26, 1883. (No model.)

*To all whom it may concern:*

Be it known that I, JOHN H. RILEY, of the city of Indianapolis, county of Marion, and State of Indiana, have invented certain new and useful Improvements in Saws, of which the following is a specification.

The object of my said invention is to produce a saw wherein part of the teeth will cut through the center of the kerf, and thus "score" or prepare the wood to be cut more easily by the regular cutting-teeth and thrown out by the clearing-teeth. This object is accomplished by placing in the saw at suitable intervals (preferably between the two prongs of each clearing-tooth) a small scoring-tooth, which is filed equally upon both sides, and thus provided with a sharp cutting-point at the exact center of the saw, as will be presently more fully described.

Referring to the accompanying drawings, which are made a part hereof, and on which similar letters of reference indicate similar parts, Figure 1 is a side elevation of a cross-cut-saw embodying my invention; Fig. 2, a detail view of a portion thereof on an enlarged scale; Fig. 3, a view, similar to a portion of Fig. 2, of the other side of the saw; Fig. 4, a cross-section of the same on the dotted line $z\ z$, alongside one of the teeth which are the feature of my invention; and Fig. 5, a cross-section through said tooth on the dotted line $y\ y$.

In said drawings, the portions marked A represent the saw-blade, and B the saw-handles, the latter of which form no part of this invention, and may be of any desired form.

The blade A is provided with cutting-teeth $a$, clearing-teeth $b$, and scoring-teeth $c$. The cutting and clearing teeth may be of the form shown, or any other desired form which is appropriate to this class of saws. The scoring-teeth are filed alike on both sides, thus forming the points in the exact centers of the teeth, and adapting them to score the bottom of the kerf before the regular cutting-teeth make the usual cut therein. The bottom of a saw-kerf, as is well known, after a saw provided with the usual cutting and clearing teeth has passed through it, is smooth and solid, and at each succeeding passage of the saw the cutting-teeth therefore cut into solid and unbroken wood, close to and in continuation of the walls of the kerf. It is obvious that a scoring of the smooth bottom of the kerf in advance of the action of the cutting-teeth is calculated to make the cutting of said teeth easier, as such cutting in that case is a cutting off of already frayed and splintered wood, rather than a cutting into a solid wooden surface. The construction of saw herein shown and described, embodying the scoring-teeth $c$, secures these advantages, and consequently renders such a saw superior to the ordinary construction, in that it will cut more easily and speedily, as I have demonstrated by practical tests.

Having thus fully described my said invention, what I claim as new, and desire to secure by Letters Patent, is—

1. A saw provided with the usual cutting and clearing teeth, and also with scoring-teeth, said scoring-teeth being filed alike on both sides, thus forming their points in the center of the teeth, and adapting them to score the bottom of the kerf in the middle before the regular cutting-teeth make the usual cut therein, substantially as set forth.

2. In a crosscut-saw, scoring-teeth $c$, interposed between the reversely-set clearing-teeth, substantially as shown and specified.

In witness whereof I have hereunto set my hand and seal, at Indianapolis, Indiana, this 23d day of June, A. D. 1883.

JOHN H. RILEY. [L. S.]

In presence of—
E. W. BRADFORD,
CHAS. L. THURBER.